US012804254B2

(12) United States Patent
Sakakibara et al.

(10) Patent No.: US 12,804,254 B2
(45) Date of Patent: Nov. 17, 2026

(54) ELECTRONIC APPARATUS THAT OPERATES USING POWER SUPPLIED FROM EXTERNAL APPARATUS AND CONTROL METHOD THEREOF

(71) Applicant: CANON KABUSHIKI KAISHA, Tokyo (JP)

(72) Inventors: Yuichi Sakakibara, Tokyo (JP); Hiroki Kitanosako, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 25 days.

(21) Appl. No.: 18/948,805

(22) Filed: Nov. 15, 2024

(65) Prior Publication Data

US 2025/0210985 A1 Jun. 26, 2025

(30) Foreign Application Priority Data

Dec. 25, 2023 (JP) ................................ 2023-218438

(51) Int. Cl.

| | |
|---|---|
| ***H04N 23/65*** | (2023.01) |
| ***H04N 23/60*** | (2023.01) |
| *H02J 7/00* | (2006.01) |
| *H02J 105/44* | (2026.01) |

(52) U.S. Cl.

CPC ............ *H04N 23/65* (2023.01); *H04N 23/60* (2023.01); *H04N 23/651* (2023.01); *H02J 7/855* (2026.01); *H02J 2105/44* (2026.01)

(58) Field of Classification Search

CPC ...................................................... H04N 23/65

See application file for complete search history.

(56) References Cited

U.S. PATENT DOCUMENTS

| | | | | |
|---|---|---|---|---|
| 6,507,195 | B1 * | 1/2003 | Nonaka | G01R 31/389 324/430 |
| 11,108,956 | B2 * | 8/2021 | Suzuki | H04N 23/51 |
| 12,363,426 | B2 * | 7/2025 | Ise | H04N 23/667 |
| 2017/0264113 | A1 * | 9/2017 | Takano | H02J 7/575 |
| 2020/0073462 | A1 * | 3/2020 | Yamanaka | G06F 1/3212 |
| 2020/0304711 | A1 * | 9/2020 | Suzuki | H04N 23/51 |
| 2021/0195104 | A1 | 6/2021 | Hayashi | |
| 2022/0344965 | A1 * | 10/2022 | Saito | H02J 7/342 |

FOREIGN PATENT DOCUMENTS

| | | | |
|---|---|---|---|
| JP | 2003-195398 | A | 7/2003 |
| JP | 2008-158287 | A | 7/2008 |
| JP | 2010-39283 | A | 2/2010 |
| JP | 2021-114755 | A | 8/2021 |

OTHER PUBLICATIONS

Japanese Office Action issued Aug. 25, 2025 during prosecution of related Japanese application No. JP 2023-218438 (English language machine translation included).

* cited by examiner

*Primary Examiner* — Cynthia Calderon
(74) *Attorney, Agent, or Firm* — VENABLE LLP

(57) ABSTRACT

An electronic apparatus operates using power supplied from an external apparatus and includes a connection unit that connects the external apparatus including a plurality of batteries, a power reception unit that receives power from the external apparatus, and a controller that decides an operation mode from activation to shutdown of the electronic apparatus based on a combination of a power source specification of the external apparatus and a power source specification of a battery mounted to the external apparatus.

20 Claims, 4 Drawing Sheets

FIG. 5

| ACCESSORY POWER SOURCE SPECIFICATION (INTERNAL RESISTANCE) | BATTERY SLOT 1 | BATTERY SLOT 2 | OPERATION MODE |
|---|---|---|---|
| SMALL | BATTERY A | BATTERY A | OPERATION MODE A |
| SMALL | BATTERY A | BATTERY B | OPERATION MODE B |
| SMALL | BATTERY A | BATTERY C | OPERATION MODE C |
| LARGE | BATTERY A | BATTERY A | OPERATION MODE B |
| LARGE | BATTERY A | BATTERY B | OPERATION MODE B |
| LARGE | BATTERY A | BATTERY C | OPERATION MODE C |

FIG. 6

| BATTERY SLOT | OPERATION MODE |
|---|---|
| BATTERY A | OPERATION MODE A |
| BATTERY B | OPERATION MODE B |
| BATTERY C | OPERATION MODE C |

ELECTRONIC APPARATUS THAT OPERATES USING POWER SUPPLIED FROM EXTERNAL APPARATUS AND CONTROL METHOD THEREOF

BACKGROUND OF THE INVENTION

Field of the Invention

The present invention relates to an electronic apparatus operated by power supplied from an external apparatus.

Description of the Related Art

Due to an increase in power consumption involved in an increase in functionality of electronic apparatuses such as digital cameras, higher output of power source is demanded. Furthermore, in order to compensate for the power shortage of the electronic apparatus, there also exists an external apparatus such as an accessory apparatus connected to the electronic apparatus to supply power to the electronic apparatus.

Some accessory apparatuses can be mounted with a plurality of batteries having the same shape in order to maintain battery compatibility. The battery mounted on the accessory apparatus is demanded to have high output, but there also exists a high-power-incompatible battery (low-power battery) which is an existing battery that does not have high output. For this reason, a usage form in which a high-power battery and a low-power battery coexist and are mounted on an accessory apparatus is also assumed, and it is desired to achieve both high output of the battery and compatibility between the high-power battery and the low-power battery.

Japanese Patent Laid-Open No. 2008-158287 describes a control method in a case where a high-power battery and a low-power battery coexist and are mounted on an accessory apparatus. In Japanese Patent Laid-Open No. 2008-158287, power is supplied by a high-power battery, and when a remaining amount (capacity) of a battery decreases, the battery is switched to a low-power battery, and some functions of an electronic apparatus that cannot be executed by the low-power battery are notified to a user.

In Japanese Patent Laid-Open No. 2008-158287, in a case where the high-power battery is switched to the low-power battery in a state where the electronic apparatus is activated, there is a possibility that a function executable with the high-power battery cannot be executed. For example, in a case where the electronic apparatus is a digital camera, some functions (e.g., high-speed continuous shooting) of the camera cannot be executed, and there is a possibility that the user may miss a photo opportunity.

SUMMARY OF THE INVENTION

The present invention has been made in consideration of the aforementioned problems, and realizes techniques for reducing a possibility that a function executable in a state where an electronic apparatus is activated cannot be executed.

In order to solve the aforementioned problems, the present invention provides an electronic apparatus comprising: a connection unit that connects an external apparatus including a plurality of batteries; a power reception unit that receives power from the external apparatus; and a controller that decides an operation mode from activation to shutdown of the electronic apparatus based on a combination of a power source specification of the external apparatus and a power source specification of a battery mounted to the external apparatus.

In order to solve the aforementioned problems, the present invention provides a control method for an electronic apparatus, wherein the electronic apparatus includes: a connection unit that connects an external apparatus including a plurality of batteries, and a power reception unit that receives power from the external apparatus; and wherein the control method includes: obtaining a power source specification of the external apparatus and a power source specification of a battery mounted to the external apparatus, and deciding an operation mode from activation to shutdown of the electronic apparatus based on a combination of the power source specification of the external apparatus and the power source specification of the battery mounted to the external apparatus.

According to the present invention, a technique for reducing a possibility that a function executable in a state where an electronic apparatus is activated cannot be executed.

Further features of the present invention will become apparent from the following description of exemplary embodiments (with reference to the attached drawings).

BRIEF DESCRIPTION OF THE DRAWINGS

FIG. 5 is a diagram illustrating a relationship between a power source specification of the accessory apparatus according to the present embodiment, a power source specification of a battery mounted on the accessory apparatus, and an operation mode of the image capture apparatus.

FIG. 6 is a diagram illustrating a relationship between a power source specification and an operation mode of a battery mounted on the image capture apparatus of the present embodiment.

DESCRIPTION OF THE EMBODIMENTS

Figure 1:
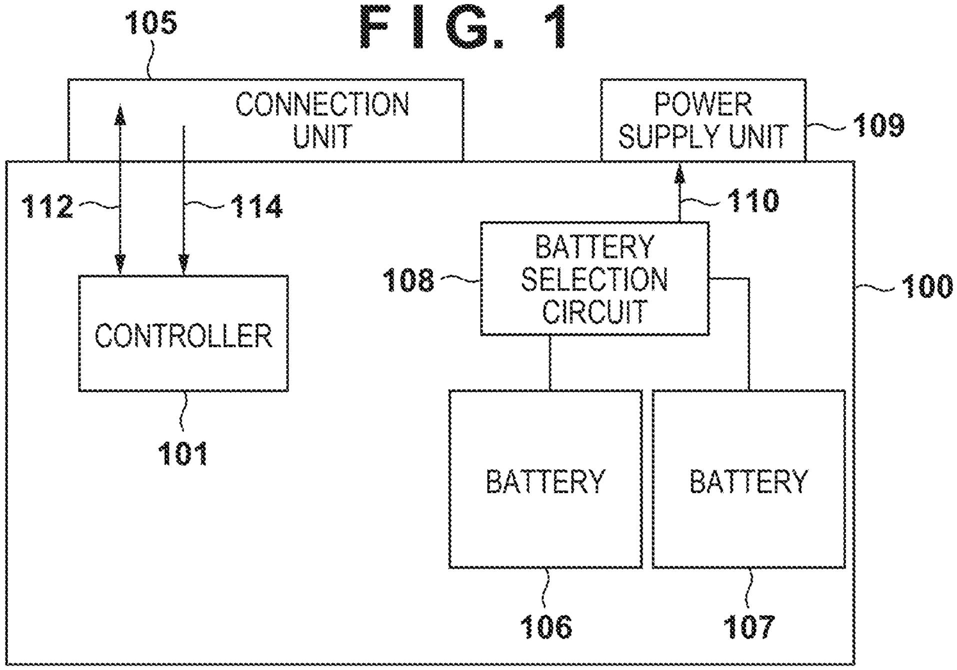
FIG. 1 is a block diagram illustrating a configuration of an accessory apparatus according to a present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the present embodiment, a case where an electronic apparatus is an image capture apparatus such as a digital still camera or a digital video camera will be described, but the electronic apparatus is not limited to a digital camera, and may be a mobile device such as a smartphone or a tablet computer (PC). Furthermore, in the present embodiment, a case where the accessory apparatus that can be mounted to the electronic apparatus is an external apparatus such as a battery grip that supplies power to the camera will be described, but the accessory apparatus may be an accessory apparatus that can expand the power source and function of the camera such as a stroboscope. Furthermore, in a case where the electronic apparatus is a mobile device, it may be a mobile battery connectable as a standby power source to the mobile device.

Apparatus Configuration

First, with reference to FIGS. 1 and 2, configurations and functions of an accessory apparatus 100 and an image capture apparatus 200 configuring the system according to the present embodiment will be described.

FIG. 1 is a block diagram illustrating a configuration of the accessory apparatus 100 according to the present embodiment.

The accessory apparatus 100 includes a controller 101 that integrally controls the entire accessory apparatus 100 via a bus (not illustrated).

The controller 101 includes a processor (CPU) that performs arithmetic processing and control processing of the accessory apparatus 100, a volatile memory (ROM) that stores a program executed by the processor, and a work memory (RAM) in which a program read from the nonvolatile memory, constants, variables, and the like for executing the program are loaded. The controller 101 loads a program stored in the ROM into the RAM and executes the program to control each component described later of the accessory apparatus 100.

The communication line 112 is a communication path for communicating with the image capture apparatus 200 via a connection unit 105. The accessory apparatus 100 communicates with the image capture apparatus 200 via the connection unit 105, and transmits information related to the accessory apparatus 100 and information related to a battery mounted on the accessory apparatus 100 to the image capture apparatus 200. Furthermore, the accessory apparatus 100 receives information related to the operation mode of the image capture apparatus 200 from the image capture apparatus 200.

The connection unit 105 is a connector that can be mechanically and electrically connected to a connection unit 214 of the image capture apparatus 200. The connection unit 105 includes an interface for the controller 101 to communicate with a controller 201 of the image capture apparatus 200 and an interface for receiving power from the image capture apparatus 200. In the present embodiment, for example, a serial peripheral interface (SPI) is used as the connection unit 105.

A plurality of batteries can be mounted on the accessory apparatus 100, and in the present embodiment, a configuration example in which two batteries 106 and 107 are mounted will be described. Note that the number of batteries is not limited to two, and may be three or more. The accessory apparatus 100 according to the present embodiment is configured such that when a plurality of batteries are mounted, a battery selection circuit 108 selects any one of the batteries as a power source so that power of the selected battery is supplied to the image capture apparatus 200 via a power supply unit 109. Note that the battery 106 and the battery 107 of the present embodiment have the same shape, and can be mounted on a battery box (not illustrated) of the image capture apparatus 200.

The battery selection circuit 108 is configured to select either the battery 106 or the battery 107 as a power source that supplies power to the image capture apparatus 200. The battery is a primary battery such as an alkaline battery or a secondary battery such as a lithium ion battery. A power source line 110 is a power supply path that supplies the power of the battery selected by the battery selection circuit 108 to the image capture apparatus 200 via a power supply unit 109.

The power supply unit 109 is a connector that can be mechanically and electrically connected to a power reception unit 216 of the image capture apparatus 200, and is configured to supply power of the battery 106 or the battery 107 to the image capture apparatus 200.

A power source line 114 is a power supply path that receives power from the image capture apparatus 200 via the connection unit 105, unlike the power source line 110 that supplies power to the image capture apparatus 200. In response to the accessory apparatus 100 supplying power to the image capture apparatus 200 via the power supply unit 109, the image capture apparatus 200 supplies power to the controller 101 of the accessory apparatus 100 via the connection unit 214.

Figure 2:
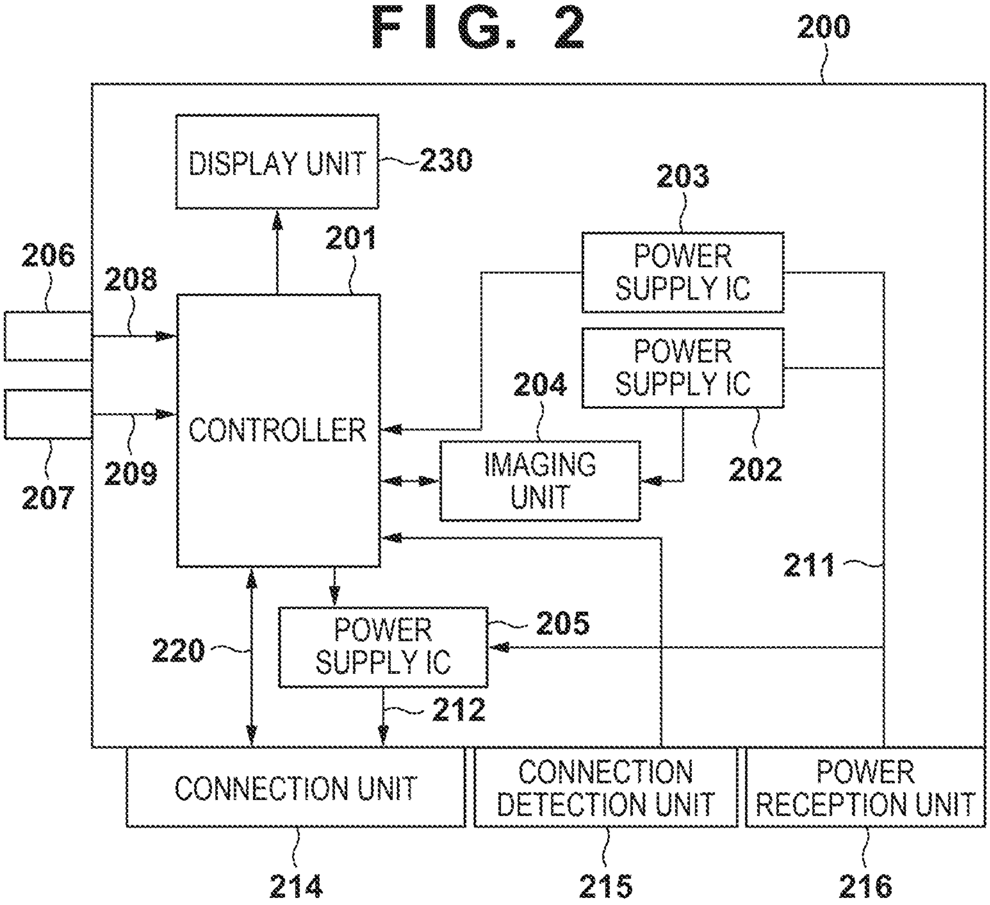
FIG. 2 is a block diagram illustrating a configuration of an image capture apparatus according to the present embodiment.

FIG. 2 is a block diagram illustrating a configuration of the image capture apparatus 200 according to the present embodiment.

The image capture apparatus 200 includes a controller 201 that integrally controls the entire image capture apparatus 200 via a bus (not illustrated).

The controller 201 includes a processor (CPU) that performs arithmetic processing and control processing of the image capture apparatus 200, a volatile memory (ROM) that stores a program executed by the processor, and a work memory (RAM) in which a program read from the nonvolatile memory, constants, variables, and the like for executing the program are loaded. The controller 201 loads a program stored in the ROM into the RAM and executes the program to control each component described later of the image capture apparatus 200.

A power integrated circuit (IC) 203 is configured to generate a power source with which the controller 201 can operate. The power supply IC 203 is configured to always supply power to the controller 201 while power is being supplied to a power source line 211 of the image capture apparatus 200, and the controller 201 maintains the activated state.

A power supply IC 202 is configured to generate power source with which an imaging unit 204 can operate.

The imaging unit 204 includes an optical system, an image sensor, an A/D conversion unit, and an image processing unit. The optical system includes a lens and a diaphragm that cause the image sensor to form a subject image. The image sensor is configured by a CCD, a CMOS, or the like that converts a subject image into an electric signal. The A/D conversion unit converts an analog image signal captured by the image sensor into a digital image signal. The image processing unit performs various types of image processing on the image signal output from the A/D conversion unit to generate image data of a still image, a moving image, and the like. Note that the controller 201 may include an image processing unit.

The controller 201 controls an imaging operation by the imaging unit 204 in response to a shooting instruction from the first operation unit 206. Furthermore, the controller 201 performs predetermined arithmetic processing using the image data, and performs exposure control and distance measurement control based on the arithmetic result.

The power supply IC 205 is configured to generate power to be supplied from the power source line 212 to the controller 101 of the accessory apparatus 100 via the connection unit 214. The power supply IC 205 is configured to generate a voltage of a level at which the controller 101 of the accessory apparatus 100 can operate. The controller 201 controls the power supply IC 205 to switch between a state in which power is supplied to the controller 101 of the accessory apparatus 100 and a state in which power supply is stopped.

The power source line 212 is a power supply path that supplies power to the controller 101 of the accessory apparatus 100 via the connection unit 214. The controller 101 of the accessory apparatus 100 is activated by receiving power supply from the image capture apparatus 200 via the connection unit 105.

The first operation unit 206 is a switch that accepts a shooting preparation instruction or a user operation of making a shooting instruction. The first operation unit 206 generates a shooting preparation signal and a shooting signal (trigger signal) corresponding to a user operation.

The signal line 208 is a signal transmission path that sends a trigger signal from the first operation unit 206 to the controller 201.

The second operation unit 207 is an operation member such as a button or a dial that accepts a user operation for making various setting instructions regarding the image capture apparatus 200. The second operation unit 207 sends a setting signal corresponding to a user operation to the controller 201.

The signal line 209 is a signal transmission path that sends a setting signal from the second operation unit 207 to the controller 201.

The connection unit 214 is a connector that can be mechanically and electrically connected to the connection unit 105 of the accessory apparatus 100. The connection unit 214 includes an interface for the controller 201 to communicate with the controller 101 of the accessory apparatus 100, and an interface for supplying power to the accessory apparatus 100. In the present embodiment, for example, a serial peripheral interface (SPI) is used as the connection unit 214.

A connection detection unit 215 detects that the connection unit 105 and the power supply unit 109 of the accessory apparatus 100 are connected to the connection unit 214 and the power reception unit 216. The connection detection unit 215 notifies the controller 201 that the accessory apparatus 100 is connected to image capture apparatus 200.

The power reception unit 216 is a connector that is mechanically and electrically connectable to the power supply unit 109 of the accessory apparatus 100 and receives electric power of the battery 106 or the battery 107 from the accessory apparatus 100.

The power source line 211 is electrically connected to the power source line 110 of the accessory apparatus 100 via the power reception unit 216 and the power supply unit 109 of the accessory apparatus 100. Note that a battery box may be provided in the power reception unit 216, and power can be supplied from a battery mounted on the battery box to the power source line 211. Furthermore, in the present embodiment, either the battery 106 or the battery 107 mounted on the accessory apparatus 100 can be used as a power source of the image capture apparatus 200 by being mounted on a battery box (not illustrated) of the image capture apparatus 200. In this case, the user can avoid the function of the image capture apparatus 200 from being restricted due to insufficient output of the battery by mounting the higher output battery of the battery 106 and the battery 107 to the image capture apparatus 200.

A communication line 220 is a communication path for communicating with the accessory apparatus 100 via the connection unit 214. The image capture apparatus 200 transmits information related to the image capture apparatus 200 to the accessory apparatus 100 via the connection unit 214, and receives information related to the accessory apparatus 100 and information related to a battery mounted on the accessory apparatus 100 from the accessory apparatus 100.

A display unit 230 includes a display device such as a liquid crystal display or an organic EL display that displays a live view image, a shot image, a graphical user interface (GUI) that performs various settings of the image capture apparatus 200, and the like. In addition, the display unit 230 is integrally configured with a touch panel that accepts user operation, and can detect the touch operation of the user on the GUI.

When power is supplied to the power source line 211 via the power reception unit 216, power is supplied from the power supply IC 203 to the controller 201, and the image capture apparatus 200 starts the operation. When detected by the connection detection unit 215 that the accessory apparatus 100 is connected, the image capture apparatus 200 supplies power from the power source line 212 to the power source line 114 of the accessory apparatus 100 via the connection unit 214.

Note that, in a case where the image capture apparatus 200 includes a battery box, a battery mounted to the battery box can be operated as a power source in a state where the image capture apparatus is not connected with the accessory apparatus 100.

Control Processing

Next, control processing of the accessory apparatus 100 and the image capture apparatus 200 according to the present embodiment will be described with reference to FIGS. 3 to 6.

Figure 3:
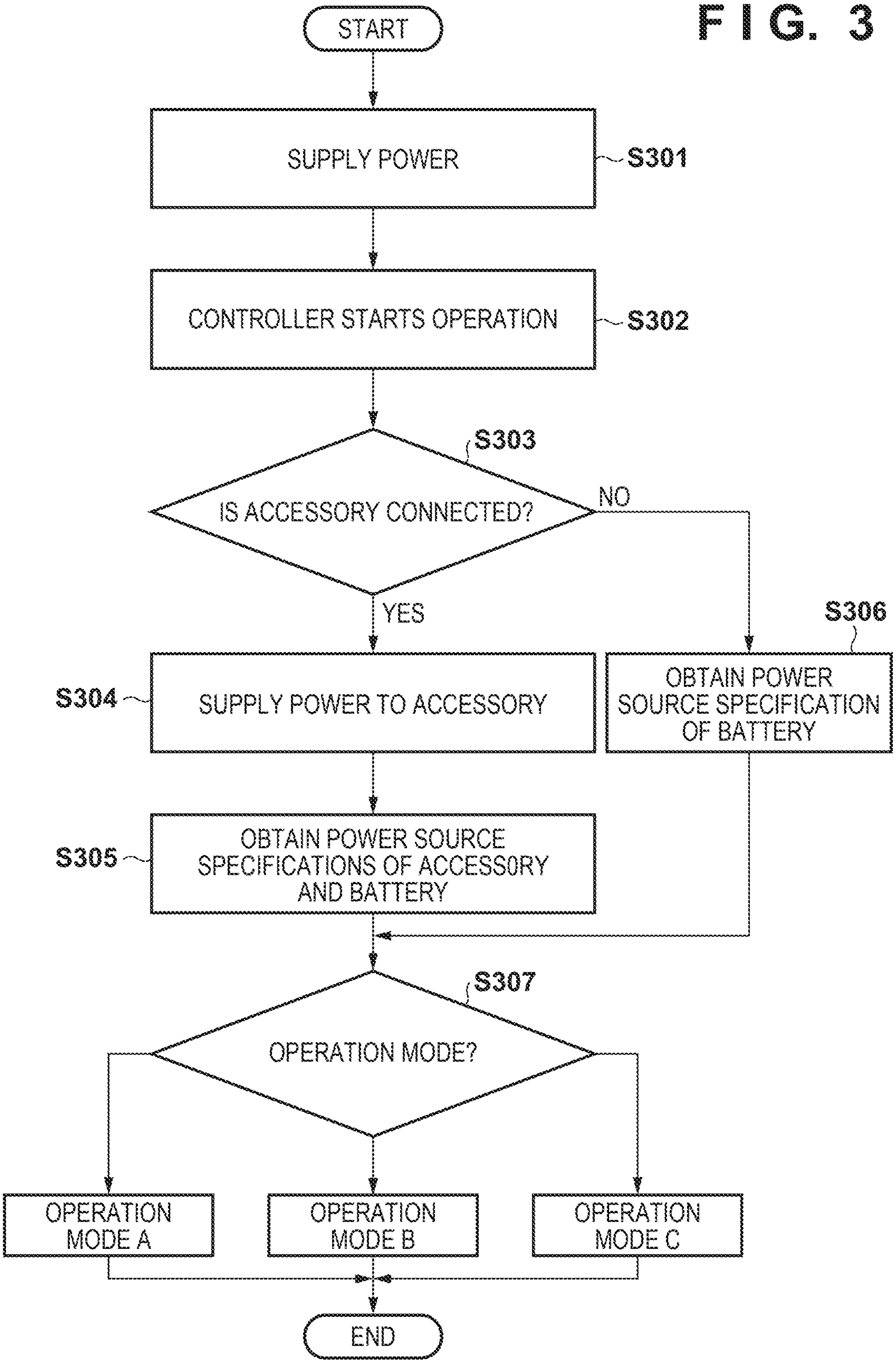
FIG. 3 is a flowchart illustrating control processing of the image capture apparatus according to the present embodiment.

FIG. 3 is a flowchart illustrating control processing of the image capture apparatus 200 of the present embodiment.

The processing of FIG. 3 is realized by the CPU of the controller 201 developing a program stored in the ROM in the RAM and executing the program to control each component of the image capture apparatus 200.

In step S301, power is supplied from the power reception unit 216 to the power source line 211 in the image capture apparatus 200.

In step S302, when power is supplied to the power source line 211 in step S301, the power supply IC 203 is activated, and the controller 201 starts the operation by the power supplied from the power supply IC 203.

In step S303, the controller 201 determines whether or not the accessory apparatus 100 is connected by the connection detection unit 215. Upon determining that the accessory apparatus 100 is connected by the connection detection unit 215, the controller 201 proceeds the processing to step S304. Upon determining that the accessory apparatus 100 is not connected by the connection detection unit 215, the controller 201 proceeds the processing to step S305.

In step S304, the controller 201 controls the power supply IC 205 to supply power from the power source line 212 to the accessory apparatus 100 via the connection unit 214.

In step S305, the controller 201 starts communication by the communication line 220 via the connection unit 214 with the accessory apparatus 100 that has started power supply in step S304. In this case, the controller 201 communicates with the accessory apparatus 100, and obtains, from the accessory apparatus 100, information such as a power source specification of the accessory apparatus 100 and a power source specification of a battery (hereinafter, accessory battery) mounted on the accessory apparatus 100.

In step S306, since the accessory apparatus 100 is not connected, the controller 201 determines that the image capture apparatus is operating using a battery (not illustrated, hereinafter referred to as internal battery) mounted to the image capture apparatus 200 as a power source, and transitions to a mode in which the image capture apparatus 200 operates using the internal battery as a power source. In this case, the controller 201 obtains information such as a power source specification of the internal battery from the internal battery.

In step S307, the controller 201 decides the operation mode of the image capture apparatus 200 based on the combination of the power source specification of the accessory apparatus 100 and the power source specification of the accessory battery obtained in step S305. The power source specification of the accessory apparatus 100 is efficiency (ratio of output power with respect to input power) determined based on power loss due to wiring resistance and other internal resistances of the accessory apparatus 100, but in the present embodiment, the internal resistance of the accessory apparatus 100 is used as a parameter. The accessory apparatus 100 of the present embodiment has a power supply capability that can supply larger power with smaller internal resistance. The power source specifications of the accessory battery and the internal battery are power supply capabilities corresponding to the rated output of the battery, the remaining amount (capacity) of the battery, and the like, and can be obtained from the type, model number, power consumption, and the like of the accessory battery. In a case where the power source specification of the accessory apparatus 100 or the power source specification of the accessory battery is a combination that enables supply of large power, the operation mode A in which all functions of the image capture apparatus 200 can be executed is selected. In a case where the power source specification of the accessory apparatus 100 and the power source specification of the accessory battery is a combination that does not enable supply of large power, the operation mode B is selected in which execution of some functions of the accessory apparatus 100 and the image capture apparatus 200 is restricted and other functions can be executed. The operation mode B is, for example, an operation mode in which at least one of a continuous shooting speed, a moving image recording, a communication function, a cooling fan, and other functions of an external accessory having large power consumption is restricted. In a case where the power source specification of the accessory apparatus 100 or the power source specification of the accessory battery is a combination that does not enable supply of power for activating the image capture apparatus 200, the operation mode C in which the activation of the image capture apparatus 200 is restricted is selected. Note that the setting of the selected operation mode is maintained from when the image capture apparatus 200 is activated until the image capture apparatus is in a shutdown state (state in which the operation is stopped by power off).

FIG. 5 illustrates a relationship among a power source specification of the accessory apparatus 100, a power source specification of a battery mounted on the accessory apparatus 100, and an operation mode of the image capture apparatus 200. In FIG. 5, the internal resistance of the accessory apparatus 100 is compared with a threshold for determining an operation mode corresponding to the function of the image capture apparatus 200 or an accessory connected to the image capture apparatus 100, as a parameter determined according to the thickness, length, or the like of the power source line 110 of the accessory apparatus 200. In the example of FIG. 5, the internal resistance of the accessory apparatus 100 is divided into two levels of "large", which is a case where the internal resistance exceeds the threshold, and "small", which is a case where the internal resistance is less than or equal to the threshold, but may be divided into three or more levels. In the example of FIG. 5, a battery having the largest power supply capability (output power=voltage×current), which is a power source specification of the accessory battery, is referred to as a battery A, a battery having the smallest power supply capability is referred to as a battery C, and a battery having the power supply capability between the battery A and the battery C is referred to as a battery B. In FIG. 5, the slot into which the battery 106 is mounted is referred to as a battery slot 1 and the slot into which the battery 107 is mounted is referred to as a battery slot 2, and the relationship among the internal resistance of the accessory apparatus 100, the type of the accessory battery, and the operation mode of the image capture apparatus 200 when any of the battery A, the battery B, and the battery C is mounted in the battery slots 1 and 2 is exemplified.

FIG. 6 exemplifies the relationship between the power source specification of the internal battery of the image capture apparatus 200 and the operation mode of the image capture apparatus 200.

In step S307 of FIG. 3, the operation mode of the image capture apparatus 200 is decided based on the power source specification of the internal battery obtained in step S306. In the example of FIG. 6, the operation mode of the image capture apparatus 200 is decided only by the type of a single battery mounted to the image capture apparatus 200.

With the above-described processing, the operation mode of the image capture apparatus 200 is decided based on a combination of the power source specification of the accessory apparatus 100 and the power source specification of the battery mounted on the accessory apparatus 100, and the decided operation mode is maintained from when the image capture apparatus 200 is activated until the image capture apparatus is in the shutdown state. As a result, even when there is a difference in power supply capability among the plurality of batteries mounted to the accessory apparatus 100, a possibility that a function that can be executed in a state where the electronic apparatus is activated cannot be executed due to insufficient output of the batteries can be reduced. For example, when a high-power battery and a low-power battery coexist and are mounted to the accessory apparatus 100, the operation mode of the image capture apparatus 200 is decided according to the low-power battery. As a result, compatibility between the high-power battery and the low-power battery is maintained in the accessory apparatus 100, and it becomes possible to stably operate the executable function of the image capture apparatus 200 without failing to be executed until all the batteries are consumed, so that the possibility that the user misses the photo opportunity by switching the operation mode of the image capture apparatus 200 due to the insufficient output of the battery can be reduced. Furthermore, even when the plurality of batteries mounted on the accessory apparatus 100 are all high-power batteries, the operation modes of the accessory apparatus 100 and the image capture apparatus 200 are decided in accordance with the internal resistance of the accessory apparatus 100, and when the internal resistance of the accessory apparatus 100 is small, a function requiring large power can be executed. This makes it possible to achieve compatibility between the high-power battery and the low-power battery and execution of a function requiring large power.

Figure 4:
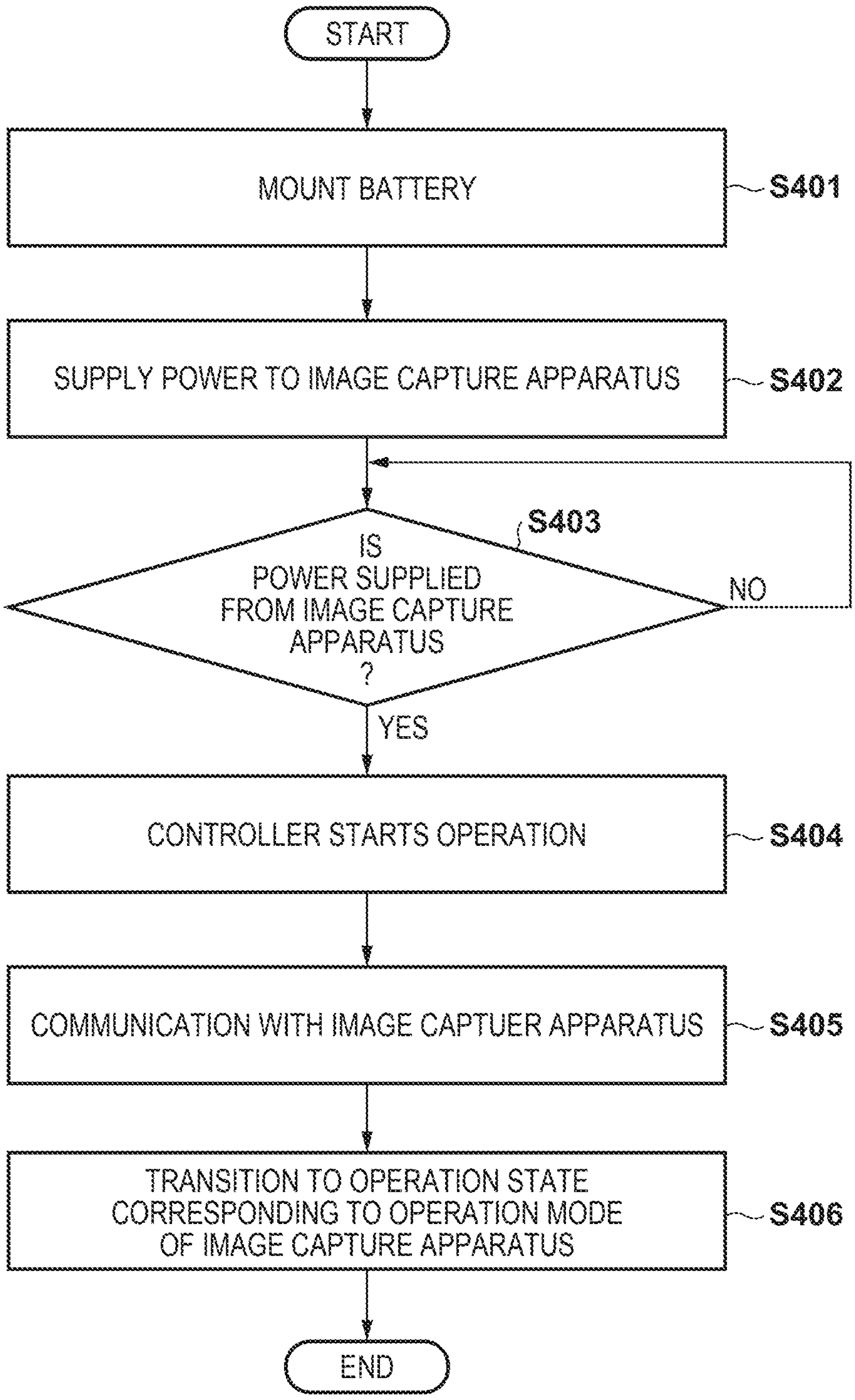
FIG. 4 is a flowchart illustrating control processing of the accessory apparatus according to the present embodiment.

FIG. 4 is a flowchart illustrating control processing of the accessory apparatus 100 according to the present embodiment.

The processing of FIG. 4 is started when the battery is mounted on the accessory apparatus 100, and the controller 101 is activated when the accessory apparatus 100 is connected to the image capture apparatus 200. After the controller 101 is activated, the processing of FIG. 4 is realized by the CPU of the controller 101 developing a program stored in the ROM in the RAM and executing the program to control each component of the accessory apparatus 100.

In step S401, when a battery is mounted to the accessory apparatus 100, the battery selection circuit 108 starts the operation. In the present embodiment, the batteries 106 and 107 are mounted on the accessory apparatus 100. The battery selection circuit 108 selects the battery 106 or the battery 107 as a power source that supplies power to the image capture apparatus 200, and supplies power to the image capture apparatus 200 via the power supply unit 109.

In step S402, the battery selection circuit 108 supplies the power of the battery 106 or the battery 107 to the image capture apparatus 200 via the power supply unit 109. In this case, although not illustrated in FIG. 4, when the battery 106 and the battery 107 is mounted to the accessory apparatus 100, the battery selection circuit 108 selects either one of the battery 106 and the battery 107 as the power source of the image capture apparatus 200. The battery selection circuit 108 detects, for example, remaining amounts of the battery 106 and the battery 107, and selects a battery having a larger remaining amount.

In step S403, the processing waits until power is supplied from the image capture apparatus 200 to the power source line 114 via the connection unit 105, and when power is supplied from the image capture apparatus 200, the processing proceeds to step S404.

In step S404, the controller 101 of the accessory apparatus 100 starts the operation by the power supplied from the image capture apparatus 200.

In step S405, the controller 101 starts communication by the communication line 112 via the connection unit 105 with the image capture apparatus 200 that has started power reception in step S403. In this case, the controller 101 communicates with the image capture apparatus 200 and receives information related to the operation mode of the image capture apparatus 200 from the image capture apparatus 200.

In step S406, the controller 101 transitions to an operation state corresponding to the operation mode of the image capture apparatus 200 received from the image capture apparatus 200.

As described above, the accessory apparatus 100 according to the present embodiment is configured such that the controller 101 is not activated only by mounting the battery 106 and the battery 107. Power for activating the controller 101 of the accessory apparatus 100 is supplied from the image capture apparatus 200 via the connection unit 105. That is, in response to the accessory apparatus 100 supplying power to the image capture apparatus 200 via the power supply unit 109, the image capture apparatus 200 supplies power to the controller 101 of the accessory apparatus 100 via the connection unit 214, whereby the controller 101 starts the operation.

As described above, since the power for the controller 101 of the accessory apparatus 100 to start the operation is looped back and supplied from the image capture apparatus 200, even in a case where the connection timings of the image capture apparatus 200 and the accessory apparatus 100 deviate, a transition in the operation states of the accessory apparatus 100 and the image capture apparatus 200 can be avoided.

The accessory apparatus 100 of the present embodiment can be connected to an apparatus in which the power source specification of the battery mounted on the accessory apparatus 100 and the mechanical configuration of the connector of the connection unit 105 or the power supply unit 109 match. However, even if it is mechanically connectable to the image capture apparatus 200, there is a possibility that the accessory apparatus 100, whose operation is not supported by the image capture apparatus 200, may be connected. In this case, the image capture apparatus 200 is not operated even when the accessory apparatus 100 is connected, thereby notifying the user that an unsupported accessory apparatus 100 has been connected.

Furthermore, the controller 201 displays, on the display unit 230, functions that can be executed according to the selected operation mode, and notifies the user of the functions. In addition, in a case where the operation mode B is selected when the accessory apparatus 100 is connected to the image capture apparatus 200, when the battery 106 or the battery 107 is directly mounted to the image capture apparatus 100 without connecting the image capture apparatus 200 and the accessory apparatus 200 and the operation in the operation mode A is enabled, notification is made to the user by displaying on the display unit 230 that the functional restriction can be avoided by using the high-power battery alone mounted to the image capture apparatus 200 among the batteries mounted to the accessory apparatus 100. In this way, the method of avoiding the functional restriction can be presented to the user in a selectable manner.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-218438, filed Dec. 25, 2023 which is hereby incorporated by reference herein in its entirety.

What is claimed is:

1. An electronic apparatus comprising:
- a first connector configured to mechanically and electrically connect with a connection unit of an external apparatus including a plurality of batteries and to communicate with the external apparatus;
- a second connector configured to mechanically and electrically connect with a power supply unit of the external apparatus and to receive power from the external apparatus; and
- a controller that obtains, by communicating with the external apparatus via the first connector, (i) a parameter indicating an internal resistance of the external apparatus, the internal resistance being related to power loss due to wiring resistance and other internal resistances of the external apparatus, the parameter being determined according to at least one of a thickness and a length of a power source line of the external apparatus, and (ii) a power supply capability of a battery mounted to the external apparatus, and decides, at an activation of the electronic apparatus, an operation mode of the electronic apparatus based on a combination of the parameter and the power supply capability.

2. The electronic apparatus according to claim 1, wherein the controller starts operation by power supplied from the external apparatus via the second connector, and supplies power to the external apparatus.

3. The electronic apparatus according to claim 2, wherein the external apparatus starts operation by power supplied from the electronic apparatus in response to the external apparatus supplying power to the electronic apparatus.

4. The electronic apparatus according to claim 1, wherein the operation mode is maintained from the activation of the electronic apparatus until the electronic apparatus is shut down.

5. The electronic apparatus according to claim 1, wherein the controller decides the operation mode based on a combination of a result obtained by comparing the parameter with a threshold and the power supply capability.

6. The electronic apparatus according to claim 5, wherein the controller selects a first operation mode in a case where the parameter is smaller than the threshold, and selects a second operation mode in which a function of the electronic apparatus is restricted more than the first operation mode in a case where the parameter is larger than the threshold.

7. The electronic apparatus according to claim 1, wherein the controller decides the operation mode according to a battery having a low power supply capability when power supply capabilities of the plurality of batteries are different.

8. The electronic apparatus according to claim 1, wherein the plurality of batteries include a first battery and a second battery having the same shape.

9. The electronic apparatus according to claim 1, wherein the controller notifies a user of a function restricted according to the combination of the parameter and the power supply capability.

10. The electronic apparatus according to claim 9, wherein the controller notifies a user that the function restricted according to the combination of the parameter and the power supply capability is executable by attaching any of the plurality of batteries to the electronic apparatus.

11. The electronic apparatus according to claim 9, wherein in a case where the electronic apparatus is a camera, the restricted function includes at least one of a continuous shooting speed, moving image recording, a communication function, and a cooling fan.

12. The electronic apparatus according to claim 9, wherein in a case where the electronic apparatus is a camera, the restricted function is a function of an accessory connected to the camera.

13. The electronic apparatus according to claim 1, wherein in a case where the electronic apparatus is a camera, the external apparatus is a battery grip that can be connected to and supply power to the camera.

14. The electronic apparatus according to claim 1, wherein the controller supplies power to a controller of the external apparatus via the first connector, and obtains the parameter and the power supply capability after the controller of the external apparatus starts operation using the power supplied from the electronic apparatus.

15. The electronic apparatus according to claim 1, wherein the parameter indicates one of a plurality of internal-resistance levels of the external apparatus.

16. The electronic apparatus according to claim 1, wherein the external apparatus includes a battery selection circuit configured to select one of the plurality of batteries as a power source to supply power to the electronic apparatus via the power supply unit of the external apparatus.

17. The electronic apparatus according to claim 16, wherein the battery selection circuit selects, as the power source, a battery having a larger remaining amount among the plurality of batteries.

18. The electronic apparatus according to claim 1, wherein the controller selects, as the operation mode, one of:
- a first operation mode in which all functions of the electronic apparatus are executable;
- a second operation mode in which execution of at least one function of the electronic apparatus is restricted; and
- a third operation mode in which activation of the electronic apparatus is restricted.

19. A control method for an electronic apparatus, wherein the electronic apparatus includes:
- a first connector configured to mechanically and electrically connect with a connection unit of an external apparatus including a plurality of batteries and to communicate with the external apparatus, and
- a second connector configured to mechanically and electrically connect with a power supply unit of the external apparatus and to receive power from the external apparatus; and wherein the control method includes:
- obtaining (i) a parameter indicating an internal resistance of the external apparatus, the internal resistance being related to power loss due to wiring resistance and other internal resistances of the external apparatus, the parameter being determined according to at least one of a thickness and a length of a power source line of the external apparatus, and (ii) a power supply capability of a battery mounted to the external apparatus; and
- deciding, at an activation of the electronic apparatus, an operation mode of the electronic apparatus based on a combination of the parameter and the power supply capability.

20. A non-transitory computer-readable storage medium storing a program for causing a computer to execute a control method for an electronic apparatus, wherein the electronic apparatus includes:

a first connector configured to mechanically and electrically connect with a connection unit of an external apparatus including a plurality of batteries and to communicate with the external apparatus, and a second connector configured to mechanically and electrically connect with a power supply unit of the external apparatus and to receive power from the external apparatus; and wherein the control method includes:

obtaining (i) a parameter indicating an internal resistance of the external apparatus, the internal resistance being related to power loss due to wiring resistance and other internal resistances of the external apparatus, the parameter being determined according to at least one of a thickness and a length of a power source line of the external apparatus, and (ii) a power supply capability of a battery mounted to the external apparatus; and deciding, at an activation of the electronic apparatus, an operation mode of the electronic apparatus based on a combination of the parameter and the power supply capability.

* * * * *